United States Patent Office
3,442,775
Patented May 6, 1969

3,442,775

FORMATION OF COATING ON GERMANIUM BODIES

John George Wilkes, Hatch End, Middlesex, and Alan Rantell, London, England, assignors, by mesne assignments, to U.S. Philips Corporation, New York, N.Y., a corporation of Delaware No Drawing. Filed Oct. 22, 1965, Ser. No. 502,313
Int. Cl. C23b 5/52
U.S. Cl. 204—37 5 Claims

ABSTRACT OF THE DISCLOSURE

A method of forming a coherent adherent layer of tetragonal germanium dioxide on a germanium surface which comprises first forming hexagonal germanium dioxide on the surface, and thereafter heating above 400° C. in an oxygen and water vapor atmosphere at a high pressure to replace the hexagonal germanium dioxide with a layer of tetragonal germanium dioxide, useful as a passivating or masking layer in the planar process.

This invention relates to improvements in methods of forming a layer of tetragonal germanium dioxide on germanium bodies.

In silicon semiconductor technology a silicon dioxide layer grown on a surface of a silicon body may be used to control the diffusion of dopants into the surface. The control is achieved by forming apertures in the silicon dioxide layer, in which case dopants only diffuse into the surface exposed through the apertures, or by forming a silicon dioxide layer of a thickness which reduces the rate of diffusion of dopants to the surface of the silicon body.

Previously similar techniques have not been used on germanium bodies because methods available to grow layers of germanium dioxide on such bodies result in the oxide having properties which make it unsuitable for purposes similar to those for which the silicon dioxide layers on silicon are used. The germanium dioxide formed by previous methods, for example oxidation by hydrogen peroxide, has a hexagonal crystal structure and is readily soluble in water and other solvents.

In a previous application a method of forming a layer of tetragonal germanium dioxide on a germanium body is described. In this method a germanium body is heated in a pressure vessel to above 400° C. while exposed to an oxidising atmosphere containing water vapour, the total pressure of the atmosphere being at least 30 kg. cm.$^{-2}$. For use in semiconductor technology it is necessary that the layer of tetragonal germanium dioxide is coherent and of controllable thickness. This method may be used to form layers of tetragonal germanium dioxide having a thickness between 1$\mu$ and 20$\mu$, but it has been found that the thinner layers may be difficult to form in a reproducible manner. The oxidation process apparently commences from nucleation sites and only layers of 1$\mu$ or more in thickness are continuous. The surface treatment of the germanium surface prior to the pressure oxidation has been found to affect the reproducibility of this method when thin layers of tetragonal germanium dioxide are being formed. With the improvement of this method to be described coherent layers of 0.5$\mu$ or less may be formed.

According to the invention in a method of forming a layer of tetragonal germanium dioxide on a germanium body, the body, which has a thin layer of hexagonal germanium dioxide formed on its surface, is heated above 400° C. while exposed to an oxidising atmosphere containing water vapour, the total pressure of said atmosphere being at least 30 kg. cm.$^{-2}$. The layer of hexagonal germanium dioxide may be formed by a known method and anodic oxidation has been found to be the most convenient.

In the improved method the addition of the water to the pressure vessel may be made by introducing a salt hydrate or compound which releases water on heating into the pressure vessel. If the water is added in the form of free water, some of the water may splash onto the sample surface and may dissolve part of the layer of hexagonal germanium dioxide before it evaporates at high temperature, also evaporation of the water may occur before the bomb is closed. Sodium carbonate hydrate has been found to be a suitable salt hydrate for introducing the water into the pressure vessel, the water being released from the hydrate on heating. However, because of efflorescence it is necessary to standardise this hydrate before use.

Two examples of the method according to the invention will now be described by way of example.

EXAMPLE I

A germanium wafer was used, which has been given a surface preparation known as such as for reception of an epitaxial layer. It was then immersed in an electrolyte consisting of a 0.1 N solution of anhydrous sodium acetate in glacial acetic acid containing 5% acetic anhydride. With a current density of 10$\mu$ amp sq. cm.$^{-1}$ for four hours an anodic layer 1,000 A. in depth of hexagonal germanium dioxide was formed. This layer was then dissolved in cold demineralised water and an anodic oxide layer having a depth of 300 A. was formed using the same current density in the same electrolyte for half an hour.

The wafer was removed from the electrolyte, washed in cold glacial acetic acid containing 5% acetic anhydride and placed in a steel high pressure vessel of 100 ml. in a platinum ampoule open at one end. An amount of standardised sodium carbonate hydrate equivalent to 0.5 ml. of water was placed in the pressure vessel. Oxygen with a pressure of 105–140 kg. cm.$^{-2}$ was introduced into the vessel which was then sealed. On heating the vessel to a temperature of 650° C. for seven hours the pressure increased to 350 kg. cm.$^{-2}$ and a layer of tetragonal germanium dioxide having a depth of 0.5$\mu$ was formed. This layer was coherent, adhered strongly to the surface of the germanium body and exhibited a uniform bronze interference colour.

EXAMPLE II

A germanium wafer having a layer of hexagonal germanium dioxide formed on a surface to a depth of 300 A. by anodic oxidation was prepared in the way as described in Example I. The wafer was washed in cold glacial acetic acid containing 5% acetic anhydride and placed in the steel high pressure vessel of 100 ml. in a platinum ampoule open at one end.

0.3 ml. of water was placed in the pressure vessel as the equivalent weight of standarised sodium carbonate hydrate. Oxygen at a pressure of 113 kg./cm.$^{-2}$ was introduced into the pressure vessel which was then sealed The vessel was heated at a temperature of 650° C. for five hours when the pressure increased to 350 kg./cm.$^{-2}$.

A layer of tetragonal dioxide having a thickness of 0.3$\mu$ was formed on the surface of the germanium wafer which layer exhibited a uniform blue colour.

The depth of the layer of tetragonal germanium dioxide formed may be controlled by variation of the time of reaction, temperature, oxygen pressure and the amount of water vapour. Layers having depths of between 0.2$\mu$ and 1.0$\mu$ have been formed using this method.

What is claimed is:

1. A method of forming a coherent adherent layer of germanium dioxide having a tetragonal crystal structure on the surface of a germanium body, comprising the steps of:

(a) first forming on the surface of the germanium body a thin layer of germanium dioxide having a hexagonal crystal structure and (b) thereafter heating the body containing the hexagonal germanium dioxide layer at a temperature above 400° C. while exposed to an atmosphere containing oxygen and water vapor until a layer of germanium dioxide having a tetragonal crystal structure is formed on the said surface of the germanium body.

2. A method as set forth in claim 1 wherein the heating takes place in a sealed vessel, and the total pressure of said atmosphere is at least 30 kg./cm.$^{-2}$.

3. A method as set forth in claim 2 wherein the hexagonal germanium dioxide layer is formed by anodic oxidation.

4. A method as set forth in claim 2 wherein the water vapor is obtained by introducing into the sealed vessel a compound which releases water upon heating.

5. A method as set forth in claim 4 wherein the compound is a salt hydrate.

References Cited

UNITED STATES PATENTS

| | | | |
|---|---|---|---|
| 3,340,163 | 9/1967 | Bradshaw et al. ------ | 204—35 |
| 2,974,075 | 3/1961 | Miller -------------- | 148—6.3 |
| 2,722,490 | 11/1955 | Haynes et al.-------- | 117—200 |
| 2,188,940 | 2/1940 | Diggory et al. ------ -- | 148—6.3 |

JOHN H. MACK, *Primary Examiner.*

W. B. VANSISE, *Assistant Examiner.*

U.S. Cl. X.R.

29—576; 117—200, 230; 148—6.3, 176; 204—56